United States Patent [19]

Sato

[11] Patent Number: 5,381,019
[45] Date of Patent: Jan. 10, 1995

[54] CURRENCY VALIDATOR USING A PHOTOCOUPLER FOR IMAGE RECOGNITION USING CYLINDRICAL LENS

[75] Inventor: Taichi Sato, Yamato, Japan

[73] Assignee: Japan Cash Machine Co., Ltd., Osaka, Japan

[21] Appl. No.: 83,191

[22] Filed: Jun. 24, 1993

Related U.S. Application Data

[63] Continuation of Ser. No. 773,019, Oct. 7, 1991, abandoned.

[30] Foreign Application Priority Data

Oct. 11, 1990 [JP] Japan ............................ 2-105931[U]

[51] Int. Cl.⁶ .............................................. G06K 5/00
[52] U.S. Cl. ........................................ 250/556; 356/71
[58] Field of Search ............... 250/556, 231.14, 237 G; 356/71; 382/4, 5

[56] References Cited

U.S. PATENT DOCUMENTS

| | | | |
|---|---|---|---|
| 3,689,774 | 9/1972 | Wildhaber | 250/556 |
| 4,616,131 | 10/1986 | Burkhardt | 250/237 G |
| 5,034,616 | 7/1991 | Bercovitz | 356/71 |
| 5,120,126 | 6/1992 | Wertz et al. | 356/71 |
| 5,129,725 | 7/1992 | Ishizuka et al. | 250/231.14 |

FOREIGN PATENT DOCUMENTS 3027769 2/1982 Germany.

*Primary Examiner*—David C. Nelms
*Assistant Examiner*—Stephone B. Allen
*Attorney, Agent, or Firm*—Bachman & LaPointe

[57] ABSTRACT

A photocoupler for image recognition is disclosed which comprises a case, a pair of a light emitting diode and a light sensitive transistor, and a cylindrical lens which forms the light emitted from the diode into a linear light image on a surface of an object having printed pattern. After reflected on a surface of the object, the linear light image passes through the cylindrical lens and is received by the light sensitive transistor.

3 Claims, 1 Drawing Sheet

CURRENCY VALIDATOR USING A PHOTOCOUPLER FOR IMAGE RECOGNITION USING CYLINDRICAL LENS

This is a continuation of co-pending application Ser. No. 773,019 filed on Oct. 7, 1991 now abandoned.

BACKGROUND OF THE INVENTION (a) Field of the Invention

The present invention relates to optical sensor means for image recognition, in particular to a photocoupler for use in optical detection of printed pattern of a bill which passes through a currency validator.

(b) Description of the Prior Art

An apparatus for currency validation is equipped in a bill handling machine such as currency exchanging or vending machine installed indoor or outdoor. The machine comprises a validator for identifying authenticity of bills inserted therein and a stacker for storing accumulated bills considered authentic by the validator. In most of the bill handling machines, the validator is mounted in driving connection to the stacker and secured to an inner surface of a door panel of the machines so that bills may be received by the validator through an inlet formed in a fixing panel of the machine. Equipped with the validator is a belt-pulley arrangement for transporting the inserted bill through a position in the vicinity of a sensor to the stacker. The sensor comprises optical or magnetic detector which converts physical features of the bill into electric signals then forwarded to a central processing unit.

Prior art optical sensors comprise a photocoupler for image recognition which includes a light emitting diode and a light sensitive transistor to detect printed white and black pattern of the bill. Light emitted from the diode is formed into a round light image on a surface of the bill and then is reflected on the surface of the bill and received by the transistor which detects the round light image. Whereas the pattern of the bill includes printed fine dots or lines, the transistor only detects the reflected round light image and therefore can not clearly detect fine dots or lines of the pattern.

SUMMARY OF THE INVENTION

Accordingly, it is an object of the present invention to provide a photocoupler for image recognition which may optically and clearly detects fine dots or lines on a printed pattern.

Another object of the present invention is to provide a photocoupler for image recognition suitable for optical detection of white and black pattern printed on a bill.

Still another object of the present invention is to provide a photocoupler for image recognition which may detect printed pattern on a bill with a linear light image.

A photocoupler for image recognition according to the present invention comprises a case; a pair of a light emitting element and a light sensitive element juxtaposed within the case; and a cylindrical lens having a convex surface and an elongated flat surface which faces the light emitting element and the light sensitive element. For instance, the light emitting element is a light emitting diode and the light sensitive element is a light sensitive transistor. The cylindrical lens is for example of the half- or semi-cylindrical shape made of glass or light permeable resin. The cylindrical lens is placed substantially at a right angle to a direction for transportation of a bill within a currency validator. In a preferred embodiment of the invention, the case is provided with two holes to receive the light emitting element and the light sensitive element. The cylindrical lens is formed with a convex surface and an elongated flat surface which faces the light emitting element and the light sensitive element. The flat surface is secured to a bottom surface of the case. The light from the light emitting element is radiated outwardly from the arcuate convex surface which then receives light reflected on a surface of an object. The light emitting or sensitive element may include a lens portion made of light permeable resin. The cylindrical lens may form the light emitted from the light emitting element into a linear light image on the object. After reflected on a surface of the object or paper currency, the linear light image passes through the cylindrical lens and is received by the light sensitive element which can clearly detect pattern printed on the object.

BRIEF DESCRIPTION OF THE DRAWINGS

A preferred embodiment of the present invention applied to a bill validator will be described with reference to the accompanying drawings in which.

Figure 1:
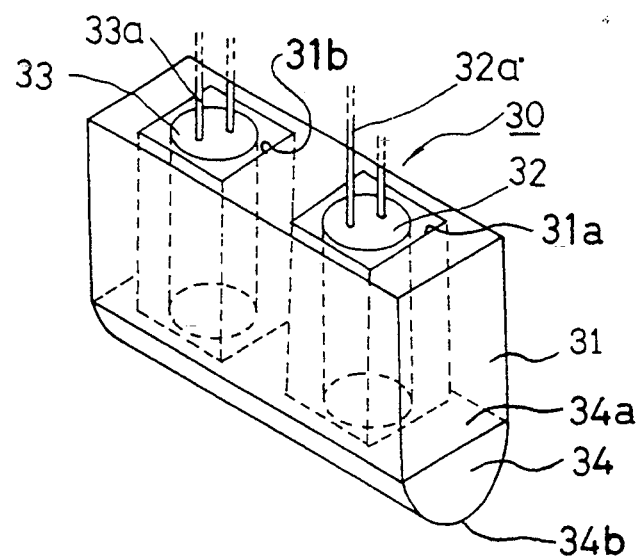
FIG. 1 is a perspective view of the photocoupler for image recognition according to the present invention.
Figure 2:
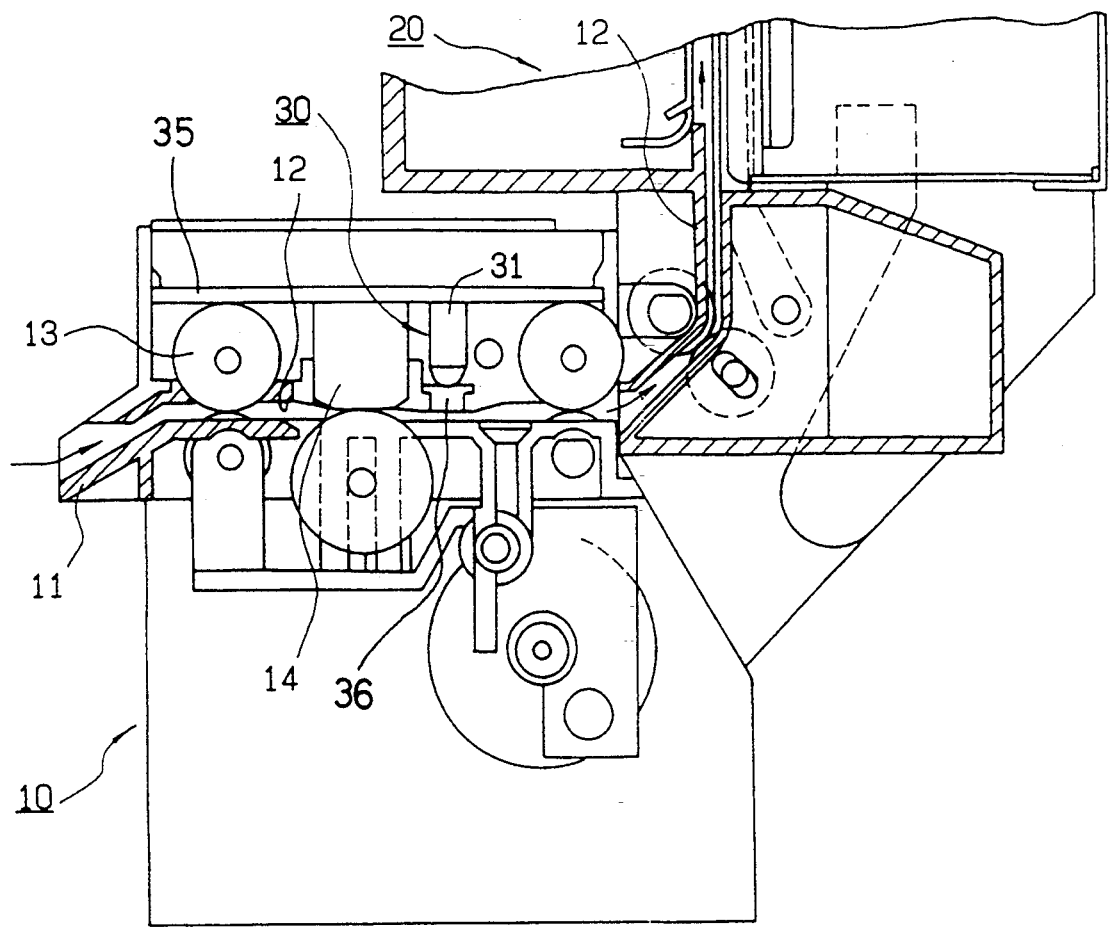
FIG. 2 is a partial section of a validator provided with the photocoupler for image recognition of the invention.

As apparent from FIGS. 1 and 2, the photocoupler 30 of the present invention comprises a case 31 approximately of rectangular shape having two holes 31a, 31b; a pair of a light emitting diode 32 and a light sensitive transistor 33 each positioned within the holes 31a and 31b in juxtaposed relation to each other and having lead wires 32a and 33a; and a cylindrical lens 34 having an elongated flat surface 34a which faces the diode 32 and transistor 33 and a convex surface 34b.

The cylindrical lens 34 is formed into one of various shapes as a part of a cylindrical lens and for example into half- or semi-cylindrical shape made of glass or light permeable resin. The flat surface of the cylindrical lens 34 is secured to a bottom surface of the case 31 by an adhesive agent.

As shown in FIG. 2, a currency validator 10 for identifying authenticity of a bill has an inlet 11 into which the bill is inserted. The bill is moved along a passageway 12 by feed rollers 13 and passes through a magnetic head 14 and the cylindrical lens 34. The cylindrical lens 34 is placed substantially at a right angle to a direction for transportation of a bill along the passageway within the currency validator 10. The cylindrical lens 34 has the arcuate convex surface 34b for emitting outwardly light from the diode 32 and receiving light reflected on a surface of the bill. In practice, an acrylic resin plate 36 is placed under the cylindrical lens 34 to compensate the distance between a print circuit board 35 and the passageway 12. After passing through the resin plate 36, the bill is then transported along the passageway 12 to a stacker 20 for storing bills conveyed from the validator 10 by a belt-pulley arrangement (not shown).

In operation, the bill inserted from the inlet 11 of the validator 10 is moved along the passageway 12 by the belt-pulley arrangement and passes through the cylindrical lens 34 of the photocoupler 30. At this time, the cylindrical lens 34 may form the light emitted from the diode 32 into a linear light image on the bill. After reflected on a surface of the bill bearing printed pattern, the linear light image is returned through the cylindrical lens 34 and is received by the transistor 33. The linear light which contains printed pattern image on the bill can clearly be detected by the transistor 33.

The foregoing embodiment of the present invention may be varied in various modes. For example, a usual or another light source may be used in lieu of the light emitting diode 32 used as a light emitting element, and a photodiode may be used in place of the light sensitive transistor used as a light sensitive element. The light emitting or sensitive element may include a usual lens portion made of light permeable resin by plastic encapsulation.

What is claimed is:

1. A currency validator comprising:
   means for advancing currency in the form of a bill along a predetermined path from a source to a bill stacker,
   a photocoupler for image recognition including a case having a pair of apertures in juxtaposed relation positioned along said path,
   a light emitting element positioned in one of said apertures,
   a light sensitive element positioned in the other of said apertures,
   a cylindrical lens having an elongated flat surface facing both said elements,
   a convex surface of said lens facing outwardly of said case, said cylindrical lens being positioned normal to the path traversed by said bill, said cylindrical lens being spaced vertically from a portion of said path thereby defining a space therebetween, and
   a transparent plate means positioned beneath said lens, said plate means having a flat surface facing said bill whereby said plate means
   (a) forms an optical path between said lens and said bill,
   (b) fills substantially the space between the said lens and said portion of said path,
   (c) precludes contact between said bill and said lens and
   (d) provides smooth passage for said bill minimizing wrinkling as the bill progresses past said case,
   whereby light emitted passes through said cylindrical lens and through said plate means, is reflected by said bill, returns through said plate means and said cylindrical lens and is received by said light sensitive element.

2. The currency validator of claim 1, wherein said transparent plate means is fabricated of acrylic resin.

3. The currency validator of claim 1, wherein a magnetic head is positioned upstream of said photocoupler.

* * * * *